United States Patent [19]

Kraemer

[11] 4,214,846
[45] Jul. 29, 1980

[54] HEAVY DUTY INSERT

[75] Inventor: Rolf H. Kraemer, Gurnee, Ill.

[73] Assignee: Fansteel Inc., North Chicago, Ill.

[21] Appl. No.: 946,031

[22] Filed: Sep. 26, 1978

[51] Int. Cl.² ............................................. B26D 1/12
[52] U.S. Cl. ................................................... 407/114
[58] Field of Search ................................ 407/114, 115

[56] References Cited

U.S. PATENT DOCUMENTS

| | | | |
|---|---|---|---|
| 3,137,917 | 6/1964 | Dowd | 407/114 |
| 3,187,406 | 6/1965 | Franko | 407/114 |
| 3,395,434 | 8/1968 | Wirfelt | 407/114 |
| 3,882,580 | 5/1975 | Lundgren | 407/114 |
| 3,911,543 | 10/1975 | Sorice | 407/115 |
| 4,116,576 | 9/1978 | Gawryk, Sr. | 407/114 |
| 4,124,326 | 11/1978 | Cost | 407/114 |

Primary Examiner—Leonidas Vlachos
Attorney, Agent, or Firm—Barnes, Kisselle, Raisch & Choate

[57] ABSTRACT

A heavy duty insert for severe machining operations having a generally rectangular body with upstanding walls and rounded corners having a cutting edge extending around the periphery thereof and an upstanding mesa inboard of the cutting edge. To provide improved machining life the cutting edge in cross-section has an arcuate surface with a small radius merging from the walls of the body into an inclined face which is intersected inwardly of the walls by a flat land extending transversely to the walls. The maximum cutting speed and in-feed rate for machining is significantly increased by a groove interposed between the mesa and a cutting edge adjacent each side wall and having a first portion extending inwardly of and downwardly below the land of the cutting edge and a second portion defining in cooperation with a side wall of the mesa a surface extending inwardly of and upwardly above the land of the cutting edge.

18 Claims, 9 Drawing Figures

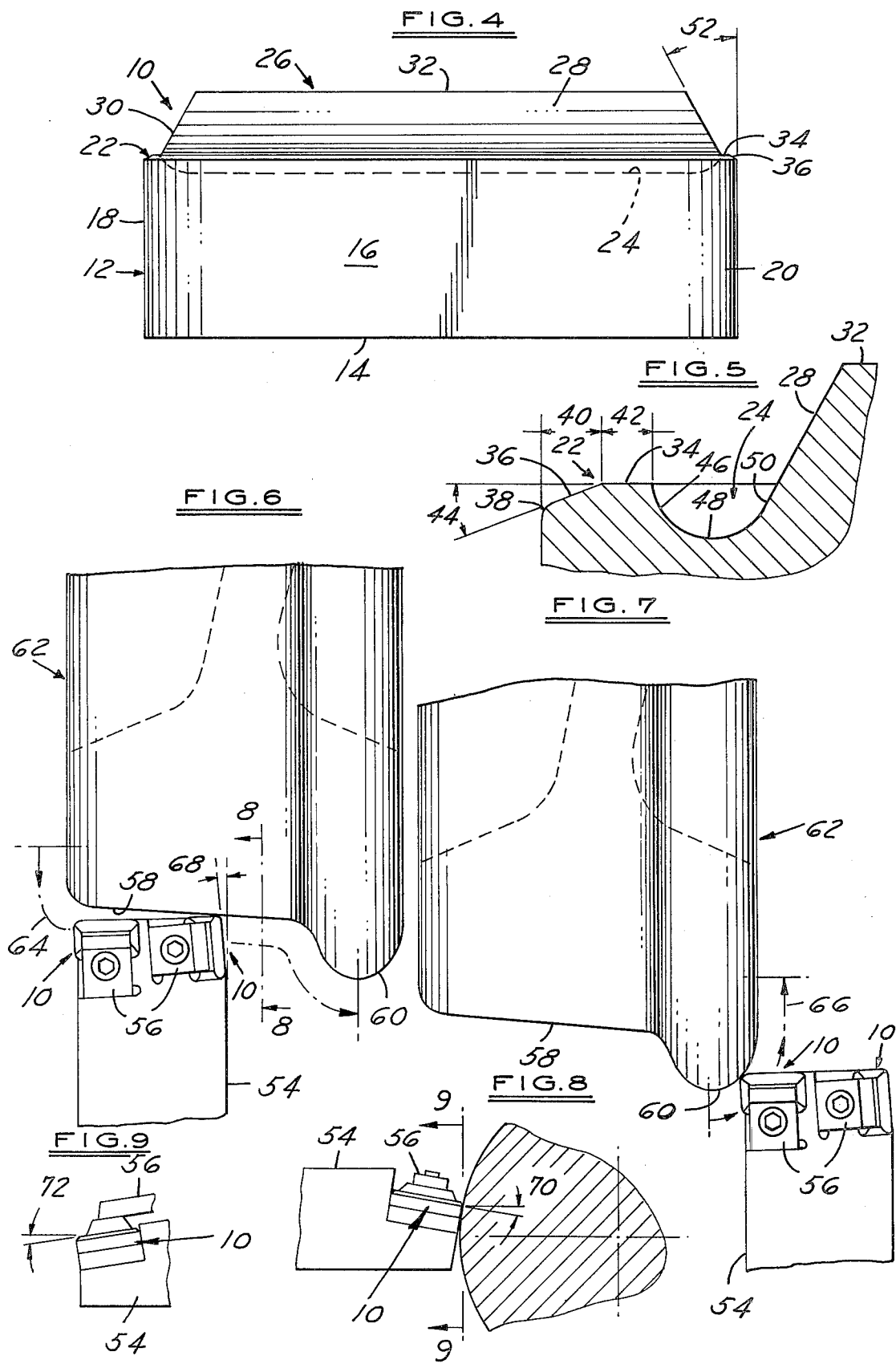

HEAVY DUTY INSERT

This invention relates to cutting tools for machining operations and more particularly to carbide cutting inserts for tools.

In recent years replaceable cutting inserts of a hard material such as cemented carbide have been used in a wide variety of applications including the machining of both new and used railroad wheels. The recutting of the wear surfaces on used railroad wheels is an extremely severe machining application since such wear surfaces typically are somewhat oxidized, have a work hardened skin or areas thereof, and have flat spots, holes, pits, chips, and gouges therein.

Objects, features and advantages of this invention are to provide a tungsten carbide cutting insert for severe machining operations which compared to prior inserts has double the in-service useful tool life, produces less heating of the insert and workpiece during machining, requires the application of substantially less force in performing machining operations, permits machining operations to be performed at substantially higher cutting speeds, produces an improved machined surface finish, has improved chip control, and is very rugged, durable and economical.

These and other objects, features and advantages of this invention will be apparent from the following detailed description, appended claims and accompanying drawings in which:

FIG. 1 is a plan view of a cutting insert embodying this invention.

FIGS. 2 and 3 are sectional views on lines 2—2 and 3—3 respectively of FIG. 1.

FIG. 4 is a side view of the carbide cutting insert of FIG. 1.

FIG. 5 is an enlarged and fragmentary sectional view on line 2—2 of FIG. 1.

FIGS. 6 and 7 are fragmentary plan views showing a pair of inserts of FIG. 1 mounted in a tool holder positioned in the first and second stages respectively of machining the wear surface of a railroad wheel.

FIG. 8 is a semischematic view on line 8—8 of FIG. 6 showing the axial rake angle of the cutting insert.

FIG. 9 is a semischematic view on line 9—9 of FIG. 8 showing the radial rake angle of the cutting insert.

Figure 1:
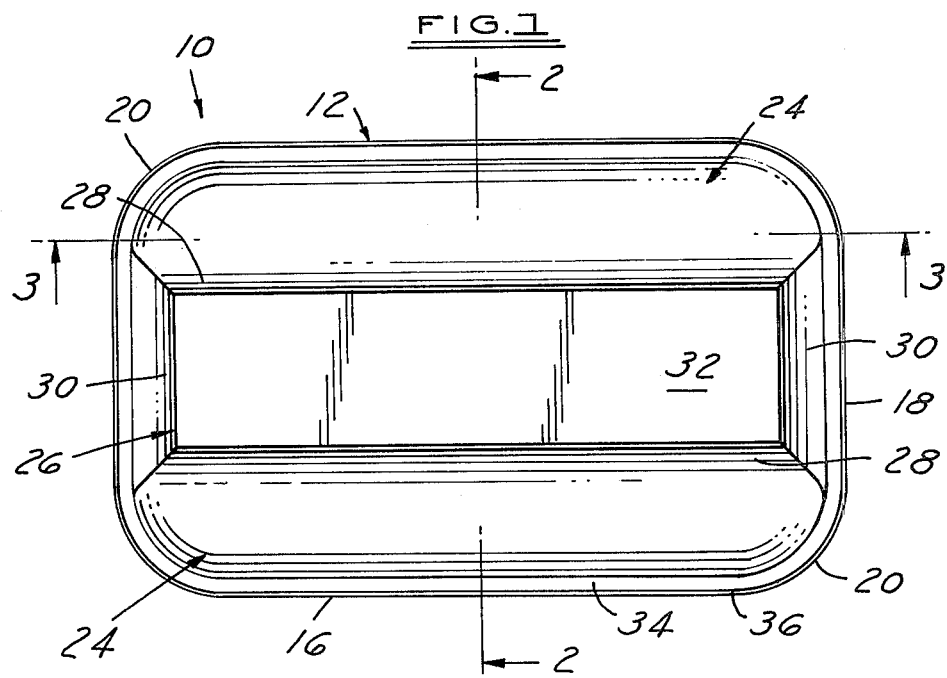
Figure 2:
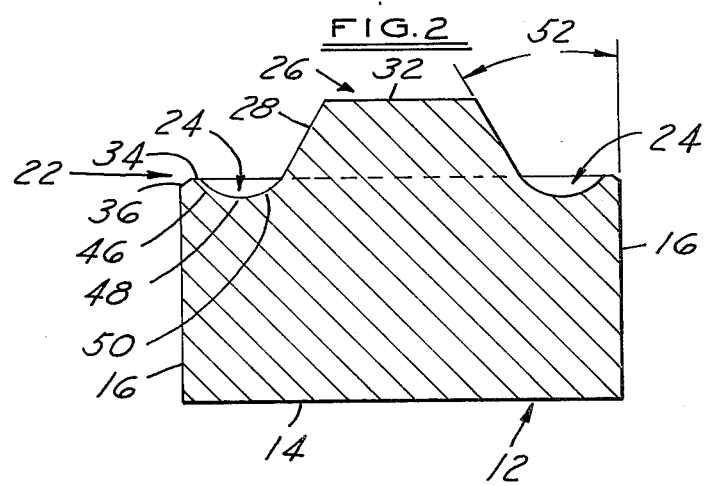
Figure 3:
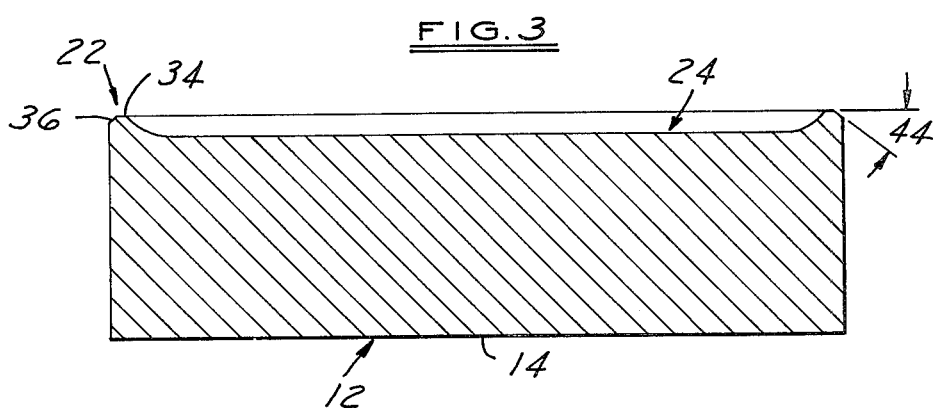

Referring in more detail to the drawings, FIGS. 1 through 5 illustrate a cutting insert 10 embodying this invention having a one piece body 12 of a hard cutting material such as tungsten carbide with a planar bottom 14 and right angular upstanding side walls 16, end walls 18 and rounded corners 20. A cutting edge 22 lies in a plane generally transverse to and extends around the periphery of the walls and the corners. Stock removed by machining is broken into chips by cooperation of longitudinally extending grooves 24 and a mesa 26 having upstanding and inclined side walls 28 and end walls 30 spaced inwardly of the cutting edge and a planar top surface 32 which is preferably parallel to bottom 14.

In accordance with this invention, to provide improved tool life, cutting edge 22, as shown in FIGS. 4 and 5, has a planar land 34, a beveled or inclined planar face 36 and a transitional arcuate surface 38 with a small radius between the inclined face and the upstanding walls 16 and 18 and rounded corners 20. The transitional arcuate surface 38 may be produced by honing and has a radius which may be in the range of about 0.003 to 0.009 and preferably 0.005 to 0.007 of an inch, and the combined width 40 of arcuate surface 38 and inclined face 36 may be in the range of about 0.015 to 0.025 and preferably in the range of 0.018 to 0.022 of an inch. The width 42 of land 34 may be in the range of about 0.015 to 0.035 and preferably in the range of 0.017 to 0.023 of an inch. The angle of inclination 44 of beveled face 36 with respect to land 34 may be in the range of about 15 to 25 degrees and preferably is in the range of 18 to 22 degrees.

In accordance with this invention higher feed rates and surface cutting speeds are achieved, the force required for and heat generated by cutting operations is decreased, and the breaking into chips of material machined from the workpiece is facilitated by grooves 24 extending longitudinally of side walls 16 and dipping downwardly below the plane of land 34 of the cutting edge immediately adjacent thereto and then extending upwardly above the plane of the land. As shown in FIG. 5, each groove 24 is preferably arcuate and has a first portion 46 extending generally inwardly and downwardly from land 34, a second portion 48 extending generally parallel to the land and forming the base of the groove and a third portion 50 blending into side wall 28 of the mesa 26 to provide a surface which extends generally inwardly and upwardly above the plane of land 34.

The maximum depth of groove 24 below the plane of land 34 may be in the range of about 0.005 to 0.015 and preferably in the range of 0.008 to 0.012 of an inch, and the radius of the groove may be in the range of about 0.115 to 0.135 and preferably in the range of 0.122 to 0.128 of an inch. The side walls 28 and end walls 30 of mesa 26 are inclined inwardly to the side walls 16 and end walls 18 respectively of the body at an included angle 52 which may be in the range of about 25 to 45 degrees and preferably in the range of 25 to 35 degrees.

Inserts 10 are made of a hard cutting material such as cemented tungsten carbide. Inserts 10 of code C-2 tungsten carbide of the U.S. Industry Classification System such as the grade VR-82 tungsten carbide produced by the V/R Wesson Company division of Fansteel Inc. and having an exterior coating of titanium carbide of about 5 microns in thickness, have been found to be highly satisfactory. The U.S. Industry Classification System is published in World Directory and Handbook of Hard Metals by Kenneth J. A. Brookes, Engineers Digest 1975.

As shown in FIGS. 6 and 7, a pair of inserts 10 retained in pockets of a tool holder 54 by clamp assemblies 56 may be utilized in an appropriate lathe (not shown) to machine the tread or wear surface 58 and retainer flange 60 of a used railroad wheel 62. As shown in FIG. 6 the lathe moves tool holder 54 along the path indicated by broken line 64 in the direction indicated by the arrows while wheel 56 is being rotated to utilize one corner of the righthand insert 10 to machine the wear surface 58 and a portion of the contour of the flange 60, and then moves tool holder 54 along the path 66 in the direction indicated by the arrows to utilize a corner of the insert 10 on the lefthand side of the tool holder to machine the remainder of the contour of the flange of the wheel. By indexing inserts 10 in the pockets of tool holder 58, two diagonally opposed corners of the inserts may be utilized to machine railroad wheels of one hand. By removing the inserts from tool holder 54 and transferring them to a tool holder of the opposite hand, the remaining two diagonally opposed corners of the inserts may also be used to machine wheels of the opposite hand, thereby utilizing all four corners of the inserts in machining operations.

As shown in FIGS. 6, 8 and 9, tool holder 54 is constructed and arranged to position inserts 10 with respect to the wheel 62 so that during the machining of surface 58 the righthand insert 10 has a lead angle 68 of about 3 degrees, an axial rake angle 70 of about 5 degrees, and a radial rake angle 72 of about 8 degrees.

Cutting inserts 10 embodying this invention have proved highly satisfactory in recutting the tread of wear surfaces of used railroad wheels with a diameter of 36 inches and a machining speed of about 180 surface feet per minute with an in-feed of 0.080 to 0.125 of an inch per revolution and a depth of cut in the range of about 3/16 to 1 inch. Such inserts have a length of 1.25 inches, a width of 0.75 inches, an overall height of 0.5 inches, and a height from the bottom to the land of the cutting edge of 0.38 inches. The cutting edge of such inserts has an arcuate surface 38 with a radius of about 0.006 inches, a combined width 40 of the arcuate 38 and inclined face 36 of 0.020 inches, and a width of the surface land 42 of 0.026 inches. Each groove 24 of such cutting inserts has a radius of 0.125 inches and a maximum depth of 0.010 inches. The side and end faces 28 and 30 of the mesa 26 are inclined at an angle of 30 degrees and face 36 of the cutting edge is inclined at an angle of 20 degrees.

In utilizing inserts 10 in remachining the wear surfaces of used railroad wheels it has been empirically determined that the useful machining life is materially decreased if the radius of curvature of arcuate surface 38 of the cutting edge is not greater than about 0.002 and less than about 0.010 of an inch. The useful machining life of the cutting inserts is also materially decreased and the cutting edge begins to chip if the combined width 40 of the arcuate surface 38 and the inclined face 36 is not greater than 0.015 and less than 0.025 of an inch or if the angle of inclination 44 of face 36 is not greater than 10 degrees and less than 30 degrees. The in-feed force that must be applied to the cutting insert and the heating thereof during machining materially increases and some plastic deformation of inserts of tungsten carbide occurs if the maximum depth of each groove 24 below land 34 is not greater than about 0.005 of an inch, and the machining life materially decreases and the cutting edge begins to chip or break away if the maximum depth of the groove is greater than about 0.015 of an inch. The maximum permissible rate of in-feed and surface cutting speed is materially decreased if the radius of each groove 24 is less than about 0.115 of an inch or greater than about 0.135 of an inch and the angle of inclination 52 of the walls of mesa 26 is not greater than about 20 degrees. The material removed from the wheels by the inserts will not be broken into chips if the angle of inclination 52 of the walls of mesa 26 is not less than about 60 degrees.

Compared to previously known commercially available inserts having the general configuration of insert 10 but without any grooves 24 and cutting edges without any inclined face 36 and arcuate surface 38, inserts 10 of code C-2 tungsten carbide with an exterior coating of titanium carbide when used for remachining the wear surfaces of railroad wheels have at least double the useful machining life, and can be used at approximately double the cutting speed and in-feed rates with substantially less in-feed force and with significantly less heating during machining operations. Moreover, inserts 10 perform highly satisfactorily in dry machining operations without any lubrication or coolant and in machining wear surfaces in all varieties of conditions with respect to oxidation, glazing, hardness, pitting and chipping.

I claim:

1. A cutting insert comprising a unitary body of a hard wear resistant material having a bottom, upstanding side walls, end walls, and rounded corners in a generally rectangular configuration, cutting edges adjacent to and extending around the periphery of said side walls and rounded corners, a mesa spaced inwardly of said cutting edges and said walls, and a chip breaker groove extending generally longitudinally of each side wall between each of said cutting edges and said mesa, each said cutting edge having a land immediately adjacent its associated groove and extending generally transversely to its associated side wall, a face between and inclined to both said land and its associated side wall, and a generally arcuate surface interconnecting said face and its said associated side wall, each said groove in cross-section having a first portion immediately adjacent the land of its associated cutting edge and extending generally inwardly and downwardly thereof below the plane of such land and a second portion inwardly of said first portion extending generally inwardly and upwardly from the bottom of such groove, and said mesa having a wall inclined inwardly from an associated groove and extending upwardly to at least the plane of the land of the cutting edge associated with such groove.

2. The cutting insert of claim 1 wherein said face of at least one of said cutting edges is inclined to its associated land at an angle in the range of 15 to 25 degrees.

3. The cutting insert of claim 1 wherein the second portion of at least one of said grooves blends into the adjacent wall of said mesa and said adjacent wall of said mesa is inclined to the side wall associated with said groove at an angle in the range of 25 to 45 degrees.

4. The cutting insert of claim 1 wherein said one groove is generally arcuate in cross-section and has a radius in the range of 0.115 to 0.135 of an inch.

5. The cutting insert of claim 1 wherein the arcuate surface of each of said cutting edges has a radius in the range of 0.003 to 0.009 of an inch, the face of each of said cutting edges is inclined to its associated land at an angle in the range of 15 to 25 degrees, the land of each of said cutting edges has a width in the range of 0.015 to 0.035 of an inch, the combined width of the inclined face and its associated arcuate surface of each of said cutting edges is in the range of 0.015 to 0.025 of an inch, the maximum depth of each groove below the land of its associated cutting edge is in the range of 0.005 to 0.015 of an inch, and the wall of said mesa adjacent each of said grooves is inclined to the side wall associated with each of said grooves at an angle of at least 25 degrees.

6. The cutting insert of claim 1 wherein said land of at least one of said cutting edges has a width in the range of 0.015 to 0.035 of an inch.

7. The cutting insert of claim 6 wherein said one groove is generally arcuate in cross-section and has a radius in the range of 0.115 to 0.135 of an inch.

8. The cutting insert of claim 1 wherein at least one of said grooves has a maximum depth below the land of its associated cutting edge in the range of 0.005 to 0.015 of an inch.

9. The cutting insert of claim 8 wherein said one groove is generally arcuate in cross-section and has a radius in the range of 0.115 to 0.135 of an inch.

10. The cutting insert of claim 1 wherein the width of said arcuate surface and its associated inclined face of at least one of said cutting edges is in the range of 0.015 to 0.025 of an inch.

11. The cutting insert of claim 10 wherein said arcuate surface of at least said one cutting edge has a radius in the range of 0.003 to 0.009 of an inch.

12. The cutting insert of claim 11 wherein the face of at least said one cutting edge is inclined to its associated land at an angle in the range of 15 to 25 degrees.

13. The cutting insert of claim 12 wherein said one groove is generally arcuate in cross-section and has a radius in the range of 0.115 to 0.135 of an inch.

14. The cutting insert of claim 12 wherein the land of at least said one cutting edge has a width in the range of 0.015 to 0.035 of an inch.

15. The cutting insert of claim 14 wherein the groove associated with at least said one cutting edge has a maximum depth in the range of 0.005 to 0.015 of an inch.

16. The cutting insert of claim 1 wherein the second portion of each of said grooves blends into its associated wall of said mesa and such associated wall of said mesa is inclined to the side wall associated with said groove at an angle in the range of 25 to 45 degrees, and extends upwardly above the plane of the land of the cutting edge associated with such groove.

17. A cutting insert comprising a unitary body of a hard wear resistant material having a bottom, upstanding side walls, end walls, and rounded corners in a generally rectangular configuration, cutting edges adjacent to and extending around the periphery of said side walls and rounded corners, a mesa spaced inwardly of said cutting edges and said walls, and a chip breaker groove extending generally longitudinally of each side wall between each of said cutting edges and said mesa, each said cutting edge having a land immediately adjacent its associated groove which land extends generally transversely to the side wall associated with such groove, a face between and inclined to both said land and associated side wall, and a generally arcuate surface interconnecting said face and associated side wall, each said groove having a substantially uniform cross-section essentially throughout the portion of the groove extending longitudinally of its associated side wall with a first portion immediately adjacent the land of its associated cutting edge which first portion extends generally inwardly and downwardly below the plane of such land and a second portion inwardly of said first portion which second portion extends generally inwardly and upwardly from the bottom of such groove, and said mesa having a wall adjacent said second portion of each groove which wall is inclined inwardly with respect to its associated groove and extends upwardly to at least the plane of the land of the cutting edge association with such groove.

18. The cutting insert of claim 17 wherein the second portion of each said groove blends into the adjacent wall of said mesa, said adjacent wall is inclined to the side wall associated with such groove at an angle of at least 25 degrees, each said groove is generally curved in cross-section with a radius in the range of 0.115 to 0.135 of an inch and has a maximum depth below the plane of the land of its associated cutting edge in the range of 0.005 to 0.015 of an inch, the generally arcuate surface interconnecting the face of each cutting edge and its associated side wall has a radius in the range of 0.003 to 0.009 of an inch, and the face of each cutting edge is inclined to its associated land at an angle in the range of 15 to 25 degrees.

* * * * *